United States Patent
Banerjee et al.

(10) Patent No.: US 12,474,708 B2
(45) Date of Patent: Nov. 18, 2025

(54) METHOD AND SYSTEM FOR NAVIGATION OF ROBOT FROM ONE AREA TO ANOTHER AREA

(71) Applicant: Tata Consultancy Services Limited, Mumbai (IN)

(72) Inventors: Snehasis Banerjee, Kolkata (IN); Sayan Paul, Pune (IN); Ruddra Dev Roychoudhury, Kolkata (IN); Abhijan Bhattacharyya, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 199 days.

(21) Appl. No.: 18/310,283

(22) Filed: May 1, 2023

(65) Prior Publication Data
US 2024/0004388 A1    Jan. 4, 2024

(30) Foreign Application Priority Data
Jun. 30, 2022    (IN) .............................. 202221037596

(51) Int. Cl.
G05D 1/02    (2020.01)
G05D 1/00    (2006.01)

(52) U.S. Cl.
CPC ......... *G05D 1/0212* (2013.01); *G05D 1/0238* (2013.01); *G05D 1/0246* (2013.01); *G05D 1/0272* (2013.01); *G05D 1/0274* (2013.01)

(58) Field of Classification Search
CPC .. G05D 1/0212; G05D 1/0238; G05D 1/0246; G05D 1/0272; G05D 1/0274
See application file for complete search history.

(56) References Cited

U.S. PATENT DOCUMENTS 12,070,847 B1 * 8/2024 Ebrahimi ............... B25J 9/1684
2018/0333853 A1 * 11/2018 Cousins ............. G01C 21/3691
(Continued)

FOREIGN PATENT DOCUMENTS

CN    110554700 A    12/2019
KR    100715609 B1    5/2007

OTHER PUBLICATIONS

Anderson, Peter et al., "On Evaluation of Embodied Navigation Agents", Title of the item: Robotics, Date: Jul. 2018, Publisher: Arxiv, Link: https://arxiv.org/pdf/1807.06757.pdf.
(Continued)

*Primary Examiner* — Navid Z. Mehdizadeh
*Assistant Examiner* — Matthew Ho
(74) *Attorney, Agent, or Firm* — FINNEGAN, HENDERSON, FARABOW, GARRETT & DUNNER LLP

(57) ABSTRACT

A system and method for navigation of a robot from a first area to a second area in a facility is provided. The present disclosure is providing robot navigation using the 'Areagoal' Navigation technique. 'Areagoal' class of problem is divided into two subtasks: identifying the area; and navigation from one area to another. The robot starts in first location and goes out of the current area if it is not in the target area. If there are multiple openings from the first area, it needs to select the most statistically close one to the target area and go there. If the target area is not reached, it backtracks to an earlier viable branch position to continue the target area search. The system takes input from RGB-D camera and odometer, while the output is action space (left, right, forward) with goal of moving to target area.

17 Claims, 8 Drawing Sheets

(56) References Cited

U.S. PATENT DOCUMENTS

| | | | |
|---|---|---|---|
| 2019/0220020 A1* | 7/2019 | Macias | G01C 21/20 |
| 2019/0220043 A1* | 7/2019 | Zamora Esquivel | G06V 10/82 |
| 2019/0375103 A1* | 12/2019 | Cui | B25J 9/1697 |
| 2021/0255638 A1* | 8/2021 | Ma | G05D 1/0221 |
| 2021/0295093 A1* | 9/2021 | Pan | G06V 20/58 |
| 2021/0333391 A1* | 10/2021 | Lee | G05D 1/024 |
| 2022/0066456 A1* | 3/2022 | Ebrahimi | G06F 3/04883 |
| 2022/0187841 A1* | 6/2022 | Ebrahimi | G05D 1/0274 |
| 2022/0206508 A1* | 6/2022 | Huang | B62D 57/032 |
| 2024/0284053 A1* | 8/2024 | Ebrahimi Afrouzi | H04N 23/56 |

OTHER PUBLICATIONS

Selek, Ana et al., "Mobile robot navigation for complete coverage of an environment", Title of the item: IFAC-PapersOnLine, Date: Apr. 2019, vol. 51, Issue: 22, pp. 512-517, Publisher: Elsevier, Link: https://reader.elsevier.com/reader/sd/pii/S2405896318332890?token=9C645C705A7E4CE6C2077E2C2A495590F66616DD5434599D7EF698F4BC3997F208BD38C1BC2A97FFF56FD5E6EFF7CBD6&originRegion::eu-west-1&originCreation=20230227113142.

Krantz, Jacob et al, "Beyond the Nav-Graph: Vision-and-Language Navigation in Continuous Environments", Title of the item: Computer Vision—ECCV 2020, Date: 2020, pp. 104-120 Publisher: Springer, Link: https://www.ecva.net/papers/eccv_2020/papers_ECCV/papers/123730103.pdf.

* cited by examiner

METHOD AND SYSTEM FOR NAVIGATION OF ROBOT FROM ONE AREA TO ANOTHER AREA

PRIORITY CLAIM

This U.S. patent application claims priority under 35 U.S.C. § 119 to: Indian Patent Application No. 202221037596, filed on 30 Jun. 2022. The entire contents of the aforementioned application are incorporated herein by reference.

TECHNICAL FIELD

The disclosure herein generally relates to the field of telepresence robot navigation, and, more particularly, to a method and system for navigation of a robot from a first area to a second area in a facility for various telepresence applications such as medical care etc.

BACKGROUND

The utility of a mobile robot expanded from personal usage to various other places such as industry, shop floor, healthcare, office etc. Additionally, robots are equally used in collocated and remote setup. As a result, a diverse set of applications have emerged where a mobile robotic platform is used by a remote operator to interact with the environment where the robot is located. These applications can be broadly categorized as telepresence application and tele-operation application. In the telepresence, the robot is essentially a mobile platform where it can move within the environment based on the remote operator's command. In the second category, a robot can perform a set of activities based on the remote operator's instruction.

The telepresence robotic system in the context of remote caregiving have become very important in recent times. The prevalent pandemic situation demands 'social distancing' as the new normal. Yet careful monitoring of patients in isolation must be taken care of without risking the lives of caregivers. Even without the pandemic, there is a shortage of caregivers in different parts of the world, which is expected to be acute during the pandemic. The availability of caregiver service must be done in a democratized manner such that individual care is possible for geographically distant individuals. A telepresence robot can address part of this issue.

However, the major hindrance in the wider deployment of telepresence systems is the ease of use, particularly for a non-expert user. Existing telepresence systems provide a manual navigation capability, which is often cumbersome for a user in a non-familiar environment. Moreover, manual navigation requires continuous user intervention to move the remote robot from place to place within the remote environment. Additionally, existing telepresence systems are tightly coupled with the robot hardware, which makes it difficult for enhancement, particularly by third-party developers. This is mainly done due to the resource constraints existing on the robot hardware. As a result, hardware independent software development should be agnostic of resource constraints.

SUMMARY

Embodiments of the present disclosure present technological improvements as solutions to one or more of the above-mentioned technical problems recognized by the inventors in conventional systems. For example, in one embodiment, a system for navigation of a robot from a first area to a second area in a facility is provided. The system comprises a camera, an odometer, a user interface, one or more hardware processors and a memory. The camera, located on the robot, configured to provide a stream of egocentric images as the robot moves. The odometer, located on the robot, configured to record coordinates of a current location of the robot in the first area. The user interface provides a target area as input, wherein the target area is the second area, wherein the first area and the second area comprise a plurality of objects. The memory is in communication with the one or more hardware processors, wherein the one or more first hardware processors are configured to execute programmed instructions stored in the one or more first memories, to: generate a growing semantic map of the facility using the stream of egocentric images and the recording coordinates from the odometer, for storing a plurality of landmarks present in the facility, wherein the plurality of landmarks is stored at a predefined time interval; create an initial grid map of N*N dimension using the coordinates, wherein N is a predefined number and the initial grid map keeps on updating the grid map on receiving a new observation from the stream of egocentric images and the odometer recordings, expanding the grid map on demand; identify coordinates of four corners of the initial grid map; perform a 360 degrees rotation to identify a current area; compare the current area with the target area; search for openings and free spaces in the current area to enter a newer area, if the robot identifies the current area is not the target area; actuate the robot to a new view, if the stream of egocentric images identifies at least one of a mirror or a blockage; backtrack the robot to the last stored landmark from amongst the plurality of landmarks, if the robot identifies a dead end; and plan the robot path towards the identified four corners of the initial grid map sequentially, if all the landmarks are exhausted, wherein the target area lies in one of the paths.

In another aspect, a method for navigation of a robot from a first area to a second area in a facility is provided. Initially, a stream of egocentric images is provided via a camera, as the robot moves, wherein the camera is located on the robot. Similarly, coordinates of a current location are recorded of the robot in the first area, via an odometer. In the next step, a target area is provided as input, wherein the target area is the second area, wherein the first area and the second area comprise a plurality of objects. Further, a growing semantic map of the facility is generated using the stream of egocentric images and the recording coordinates from the odometer, for storing a plurality of landmarks present in the facility, wherein the plurality of landmarks is stored at a predefined time interval. In the next step, an initial grid map is created of N*N dimension using the coordinates, wherein N is a predefined number and the initial grid map keeps on updating the grid map on receiving a new observation from the stream of egocentric images and the odometer recordings, expanding the grid map on demand. In the next step, coordinates of four corners of the initial grid map are identified. Further, a 360 degrees rotation is performed to identify a current area. The current area is then compared with the target area. In the next step, the current area is searched for openings and free spaces, to enter a newer area, if the robot identifies the current area is not the target area. In the next step, the robot is actuated to a new view, if the stream of egocentric images identifies at least one of a mirror or a blockage. Further, the robot is backtracked to the last stored landmark from amongst the plurality of landmarks, if the robot identifies a dead end. And finally, the robot path is planned towards the identified four corners of the initial grid map sequentially, if all the landmarks are exhausted, wherein the target area lies in one of the paths.

In yet another aspect, one or more non-transitory machine-readable information storage mediums comprising one or more instructions which when executed by one or more hardware processors cause navigation of a robot from a first area to a second area in a facility is provided. Initially, a stream of egocentric images is provided via a camera, as the robot moves, wherein the camera is located on the robot. Similarly, coordinates of a current location are recorded of the robot in the first area, via an odometer. In the next step, a target area is provided as input, wherein the target area is the second area, wherein the first area and the second area comprise a plurality of objects. Further, a growing semantic map of the facility is generated using the stream of egocentric images and the recording coordinates from the odometer, for storing a plurality of landmarks present in the facility, wherein the plurality of landmarks is stored at a predefined time interval. In the next step, an initial grid map is created of N*N dimension using the coordinates, wherein N is a predefined number and the initial grid map keeps on updating the grid map on receiving a new observation from the stream of egocentric images and the odometer recordings, expanding the grid map on demand. In the next step, coordinates of four corners of the initial grid map are identified. Further, a 360 degrees rotation is performed to identify a current area. The current area is then compared with the target area. In the next step, the current area is searched for openings and free spaces, to enter a newer area, if the robot identifies the current area is not the target area. In the next step, the robot is actuated to a new view, if the stream of egocentric images identifies at least one of a mirror or a blockage. Further, the robot is backtracked to the last stored landmark from amongst the plurality of landmarks, if the robot identifies a dead end. And finally, the robot path is planned towards the identified four corners of the initial grid map sequentially, if all the landmarks are exhausted, wherein the target area lies in one of the paths.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
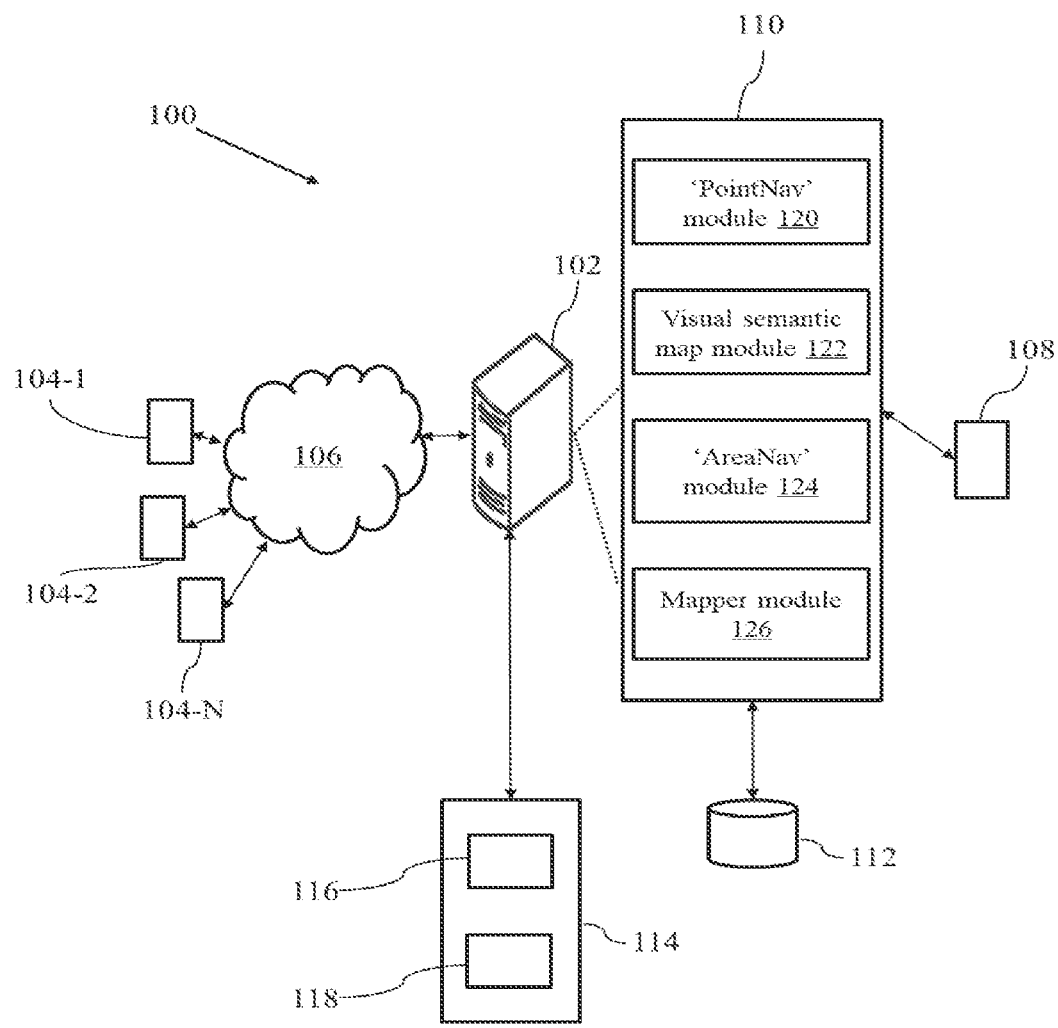
FIG. 1 shows a block diagram of a system for navigation of a robot from a first area to a second area in a facility according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

A telepresence system typically maintains a real-time connection with an application at the caregiver's end and acts as an Avatar of the caregiver at the patient's premise. The caregiver must navigate the patient's premise in real-time through the Avatar based on the audio-visual feedback as part of the ongoing real-time multimedia chat. In most of the systems, the robot Avatar is maneuvered by the remote caregiver through manual instructions using on-screen navigation buttons, joystick, keyboard, etc. However, in an unknown premise, it would be too tedious for the caregiver to manually navigate the robot to the desired location.

There has been a significant amount of work done in the telepresence scenario. The majority of telepresence systems are intended for use in an office setting, and other application areas with the elderly, in healthcare, and in research. Most of the work has focused on the hardware capabilities and features. In terms of software, a number of components have been to perform embodied artificial intelligence (AI) tasks to give a flavor of cognitive intelligence to the telepresence scenario. One of the prior art supports some simple software level cognitive features.

In terms of the embodied AI tasks, individual efforts on the subtasks has recently gained focus of the research community—like cognitive navigation and human-robot dialogue. In cognitive navigation, for the 'PointGoal' problem (moving from one point to another point in same region), there exists some work that uses frontier based planners. In terms of 'AreaGoal' problem, there has not been much dedicated work that has happened apart from some work on scene graph analysis to decide the region.

The present disclosure provides a system and method for navigation of a robot from a first area to a second area in a facility. The present disclosure is providing robot navigation using the 'Areagoal' Navigation technique. In the present disclosure an area (A) and a boundary (P) are defined as below. The area or a region in the context of robot navigation is defined as a region or zone in space where the robot can navigate. Unreachable areas or obstacle-blocked areas are not considered. Definition of Concrete Boundary (P): The boundary of an area is the region outlining the polygonal sides of it. However, there may be cases like passage, door, openings where there is an overlap between two or more areas. Concrete Boundary marks the line after crossing which there is zero membership of that sub-area to other areas/regions.

The main task of the system of the present disclosure is to solve 'AreaGoal' class of problems. 'Areagoal' class of problem is divided into two subtasks: identifying the area;

and navigation from one area to another. Once the robot starts in a random location (referred as a first area), first, the robot identifies the area it is currently in. Next, the robot goes out of the current area if it is not in the target area. If there are multiple openings from the first area, it needs to select the most statistically close one to the target area and go there. If in those steps, the area is not reached, it needs to do a backtrack to an earlier viable branch position to continue the area search. The proposed system comprises of an input space comprising of sensor observations of RGB-D (Red-Green-Blue color channels and Depth channel) image and odometry readings, while the output is a member of the action space (left, right, forward) with goal of moving to target area.

The system of present disclosure facilitates the caregiver to provide a remote verbal instruction to the robot to navigate near a desired location inside the room (e.g., 'bedroom'). A speech-based human-robot interaction (HRI) has been provided, to further increase the usability and acceptability of the robot. Based on ego view scene analysis, the robot is able to move to a position near to the intended location. Once the robot reaches 'near' that position, the caregiver can take manual control and perform finer control through on-screen navigation buttons.

Referring now to the drawings, and more particularly to FIG. 1 through FIG. 7B, where similar reference characters denote corresponding features consistently throughout the figures, there are shown preferred embodiments and these embodiments are described in the context of the following exemplary system and/or method.

According to an embodiment of the disclosure, FIG. 1 illustrates a block diagram of a system 100 for navigation of a robot 114 from the first area to the second area in the facility. The robot 114 is fitted with a camera 116 and an odometer 118 In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of units for performing various functions. The plurality of units comprises a 'PointNav' module 120, a visual semantic map module 122, an 'AreaGoal' module 124 or 'AreaNav' module 124, a and a mapper module 126, The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

One of the principal tasks that an embodied AI agent needs to perform very well is navigation. In this regard, the navigation tasks have been classified into 'PointGoal' (go to a point in space), 'ObjectGoal' (go to a semantically distinct object instance), and 'AreaGoal' (go to a semantically distinct area). The 'AreaGoal' problem also called as 'AreaNav'. The 'ObjectGoal' navigation task results are evaluated on following evaluation metrics: 1. Success: It is the ratio of the successful episode to total number of episodes. An episode is successful if the agent is at a distance ≤1.0 m from the target object at the end of episode. 2. Step count. In the AI habitat environment, the robot action space consists of three actions—turn right by 30 degrees, turn left by 30 degrees, and move forward by 0.25 meters. Each such action is counted as one step. A single rotation is also considered as a step. A full 360° rotation equates to 12 total steps. The less the number of steps taken, the better is the methodology.

Figure 2:
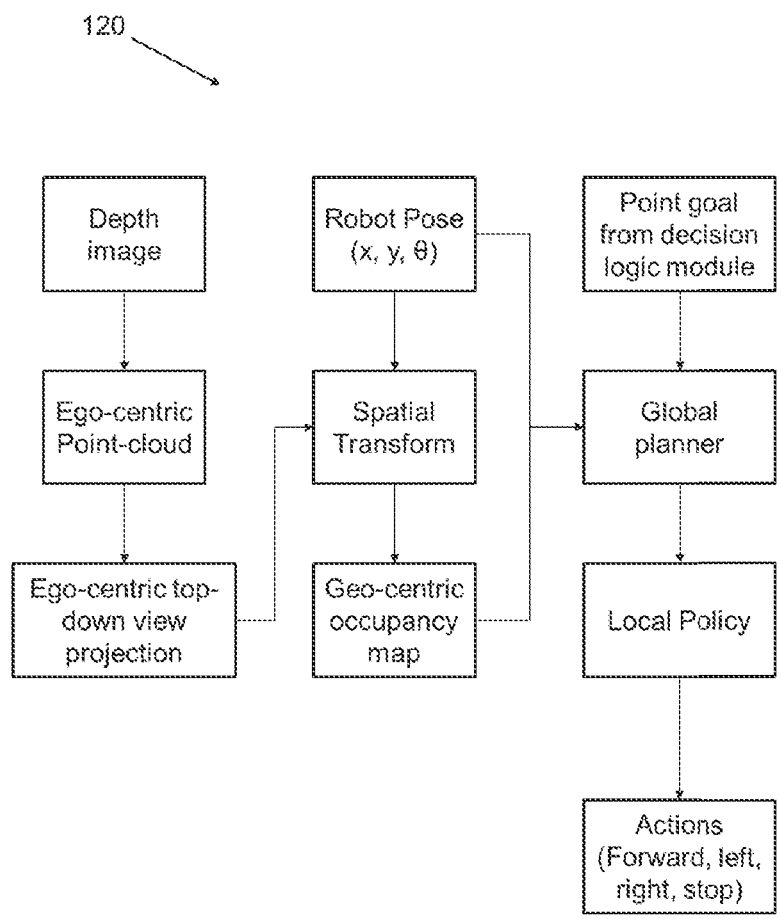
FIG. 2 shows a block diagram of a 'PointNav' module according to some embodiments of the present disclosure.

According to an embodiment of the present disclosure, the PointNav' subtask is leveraged by the 'AreaGoal' module 124 in order to move from one point to another pre-specified point location (perform local path planning). The system 100 comprises the 'PointNav' module 120 (or the 'PointGoal' module 120), configured to navigate from one point to another point. A block diagram of the 'PointNav' module 120 is shown in FIG. 2. Given a start location ($x_1$, $y_1$) and an end goal location ($x_2$, $y_2$) for a ground robot, the task of the 'PointNav' module 120 is to help the robot navigate to the end goal location within a certain predefined threshold without colliding with static obstacles present in the environment. The robot is provided with the RGB-D (Red-Green-Blue color channels and Depth channel) camera sensor 116 and wheel encoders that gives at each timestep, the RGB image, Depth image and absolute pose of the robot with respect to the start location. The depth image is converted to an egocentric point cloud using known camera intrinsic and then it is flattened along the vertical axis (z-axis) to obtain an egocentric top down projection occupancy map which contains the obstacles the robot perceives from its current point of view.

This egocentric map is in camera coordinate space and is transformed to the world coordinate space using the absolute pose at that timestep by the spatial transform block (ST) to update the geocentric map. This updated geocentric map, current location and the goal location is fed to the Global Planner at every timestep t, which generates a feasible short but safe trajectory or path from the current location to the goal location. The global planner used here is a modified implementation of the A* Algorithm where the free-space costmap is weighted more near the obstacles. As a result, the generated trajectories or paths are planned at a safe distance from the obstacles. It tries to find a balance between finding the shortest path to the goal and avoiding collisions with obstacles. This planned path and the current pose is then fed to the local policy which is a heuristic planner that finds the next best action to be performed by the robot to align and follow the path generated by the global planner.

In the present disclosure, a modular approach has been used to solve this 'Pointnav' task where mapper, global planner and local policy is stacked one after the other. This decoupled approach helps the method of present disclosure to generalize to different environments without the need for re-training or finetuning as compared end-to-end learned approaches.

According to an embodiment of the disclosure, the system 100 comprises the visual semantic map module 122. The visual semantic map module 122 is configured to backtrack the robot to its previous place in case of the dead end. When the robot 114 is moving in an unknown environment, it is imperative to create a map of its surroundings while it is moving. While a traditional Visual SLAM-based approaches helps in 'PointNav' problem, however, for tasks needing higher level semantic understanding of the scene, a metric map or voxel map is not sufficient. Hence, an alternative Visual Semantic Map is utilized that uses odometry data of the robot combined with perception (like RGB camera) to create a map that is both metric (relative distance level granularity) and topological (connection between scene graphs). The map is further enhanced with external semantic level features to link regions and objects in view.

The history of scene graphs extracted from a sequence of scenes along with their time synced odometry data helps in generating the map. The initial position of the robot is taken as (0,0,0) in 3-D co-ordinate space facing east. In case the robot is navigating in the same floor or elevation, the z-axis (height) will be always positive, whereas translation of robot will happen in (x, y) plane. The 'z' axis data points observed from ego view helps in aiding the robot in where to look in a space while finding an object. As an example, 'paintings' should be on wall at some height, whereas 'sofa' will be grounded on floor.

Figure 3:
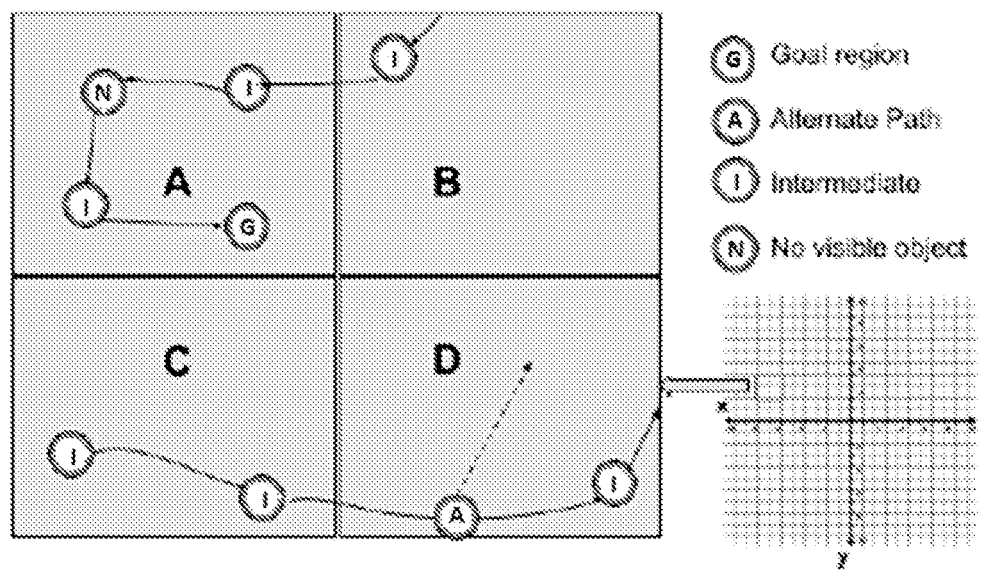
FIG. 3 illustrates a grid map for back tracking to next the unexplored landmark point for 'AreaGoal' task according to some embodiments of the present disclosure.

The specific data-structure used for this is a grid as shown in FIG. 3. It is computationally inefficient to search each and every point when the robot 114 needs to look for the next unexplored landmark. Hence a pre-initialized grid structure with a large enough area (more than average area of house layouts) is initialized. Later if needed, this grid expands if robot's next expected move position is out of the grid. Each grid square cell has a set of Boolean tags: explored or unexplored; having alternative branch path or not. Each grid cell can consist of multiple points where the robot 114 has taken an observation—this also include the objects identified in the view. Each of the points has a view angle associated with it. In a navigation set of steps of moving forward, the side view objects and openings which were kept out of view will be ignored. So later if backtracking is needed, those unexplored view angles can be used for further inspection. If a robot has reached a dead end say (x, y, θ: 2, 3, 300), and need to backtrack it can find the nearest cell to backtrack from the list of alternative path points (shown in circle with A in FIG. 3) kept in a list. Also, when the robot 114 is exploring, it can look ahead a few grid cells (if previously visited) to find the best grid cell to move to maximize the objective of the specific long term navigation task.

Figure 5:
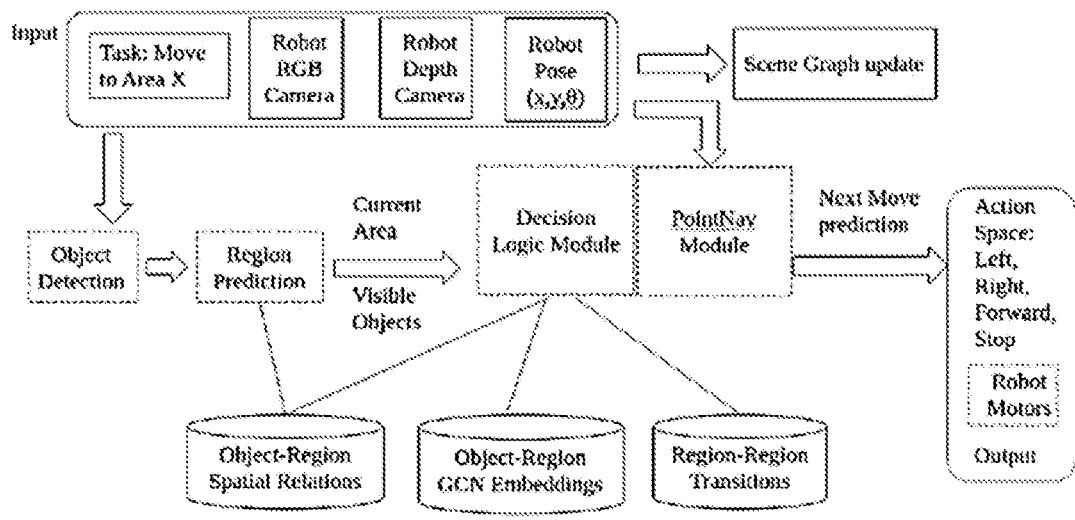
FIG. 5 shows a system architecture of an 'AreaNav' module according to some embodiments of the present disclosure.

According to an embodiment of the disclosure the system 100 comprises the 'AreaNav' module 124 as shown in the block diagram of FIG. 5. In order to decide task completion of the system 100, there is a need to define the problem statement. In the present disclosure, the three problems are identified as follows:

Problem 1: A robot R needs to traverse to enter the concrete boundary P of an area A, given a goal task to navigate there. Hence, just getting a view of the area is not sufficient, the robot needs to be within the area for the task to be complete. This is denoted as 'AreaGoal' task.

Problem 2. The above task completes when the area/region comes into robot perception view. This is a softer 'AreaGoal' problem. This can come handy when just the outside view serves the purpose. This is denoted as 'ViewAreaGoal' task.

Problem 3. The robot needs to navigate to the centroid point or centroid sub-region with radius of 1.0 m of the goal area. However, for this problem, the layout of the area needs to be known beforehand or learned apriori by exploration. Also, there can be blockage in the center. This is denoted as 'CenterAreaGoal' task. While the earlier problem definitions are for unknown map-less environment, the latter either requires a metric map or run-time map generation based on the approximate navigable center point by taking into view the depth of surrounding objects (like walls) and free space.

Figure 4:
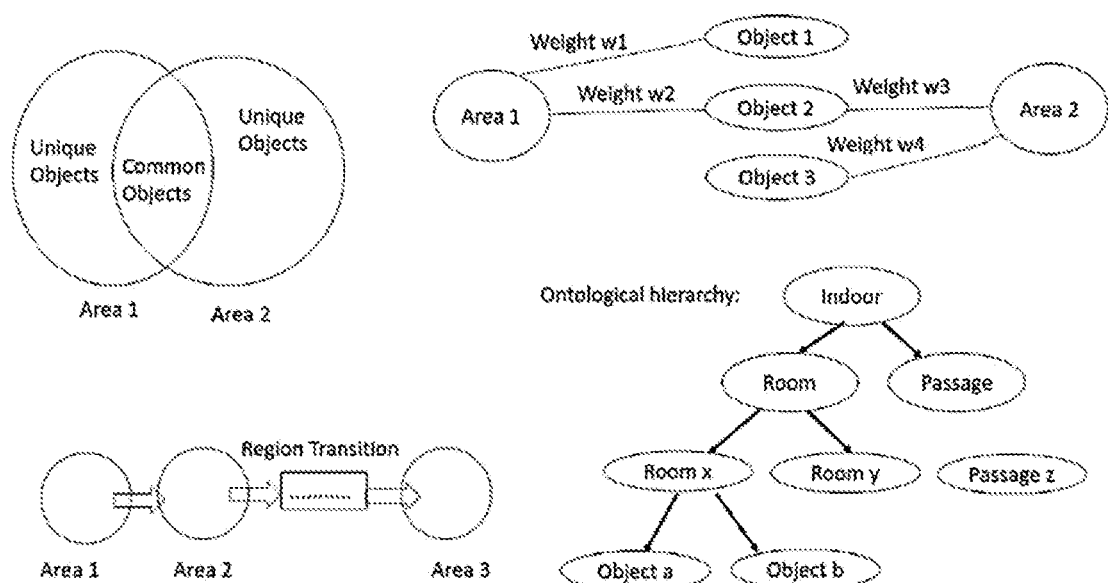
FIG. 4 shows a plurality of ways to represent the concept of Area according to some embodiments of the present disclosure.

As shown in FIG. 4, two or more areas can have common objects while some areas will have tight coupled unique objects. The unique objects aid in area identification with high accuracy. Also, region transition paths plays a complementary role in area search. If a robot is in current location within area A, and target area is T, then based on whether A and T are adjacent or if there is a need to traverse through intermediate areas. This insight can aid in navigation planning. Another aspect is related to edge weights between objects and regions as nodes. This spatial relational graph will aid in statistically deciding the current area among the set of regions. Finally, a good way to represent indoor environment is by means of ontology, where areas can be divided into passages and room enclosure and rooms can be subdivided into specific areas like bedroom, toilet. Each area can be represented as a composition of objects.

The main task of 'AreaGoal' class of problems is divided into two subtasks: 1. identifying the area; and 2. navigation from one area to another area. Once the robot starts in a random location, first, the robot identifies the area it is currently in. Next, the robot goes out of the current area if it is not in the target area. If there are multiple openings from current area, it needs to select the most statistically close one to the target area and go there. If in those steps, the area is not reached, it needs to do a backtrack to an earlier viable branch position to continue the area search. The proposed system comprises of an input space comprising of sensor observations of RGB-D image and odometry readings, while the output is a member of the action space (left rotate, right rotate, move forward, stop) with goal of moving to target area.

Figure 6:
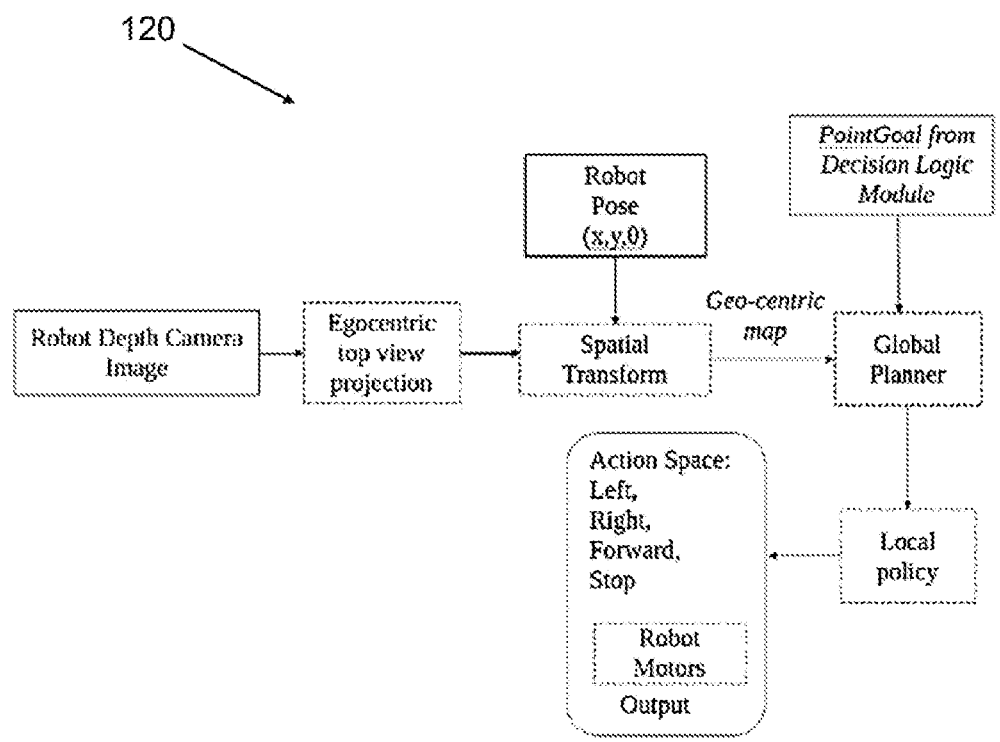
FIG. 6 shows a block diagram for invoking the 'PointNav' module for navigation towards objects or grid map corners according to some embodiments of the present disclosure.

As navigating from one area to another is a long term goal, it is broken into local goals that are handled by the 'PointNav' module 120. FIG. 6 shows invocation of the 'PointNav' module 120 for navigation towards objects or grid map corners. Based on the robot's current pose and the given goal location, the 'PointNav' module 120 plans the shortest navigable path. Also, when the robot is stuck in an area, an external fair point is given as a goal to the 'PointNav' module 120 for it to explore out of that stuck area.

The operation of the 'PointNav' module 126 is dependent on several software entities. They are enlisted below. (a) Region Relation Graph: An indoor space is comprised of objects and areas (regions). There are some specific objects like cup, chair; and there are some generic objects like wall, ceiling, floor which are continuous. There are three types of generic spatial relations: (a) object near another object, like table near chair (b) objects situated within a region, like bed as an object in region 'bedroom' (c) regions closely connected with other regions, like regions 'dining room' and 'kitchen'. The list of indoor objects (as a subset of MS Coco) considered are: bench, bottle, wine glass, cup, fork, knife, spoon, bowl, banana, apple, sandwich, orange, broccoli, carrot, hot dog, pizza, donut, cake, chair, sofa, potted plant, bed, dining table, toilet, TV monitor, laptop, mouse, remote (TV), keyboard, cell phone (mobile phone), microwave, oven, toaster, sink, refrigerator, book, clock, vase, scissors, teddy bear, hair drier and toothbrush. The regions (areas or zones) considered are: bathroom, bedroom, dining room, study room, kitchen, living room, toilet, balcony and passage.

Two separate approaches were used to create a weighted relation graph. An entry in that relation graph is 'bed' and 'bedroom' having very high relationship weight close to 1.0. In approach A, these relations were extracted and normalized through a user survey comprising questions and responses. In approach B, the weights were learnt via observations registered in random walks in AI habitat environment on a large number of indoor realistic scenes. Through ablation studies in various indoor layouts and scenes, it was found that manual questionnaire based aggregated relation weights, provided better results for the 'AreaGoal' area identification subtask.

Figure 7A:
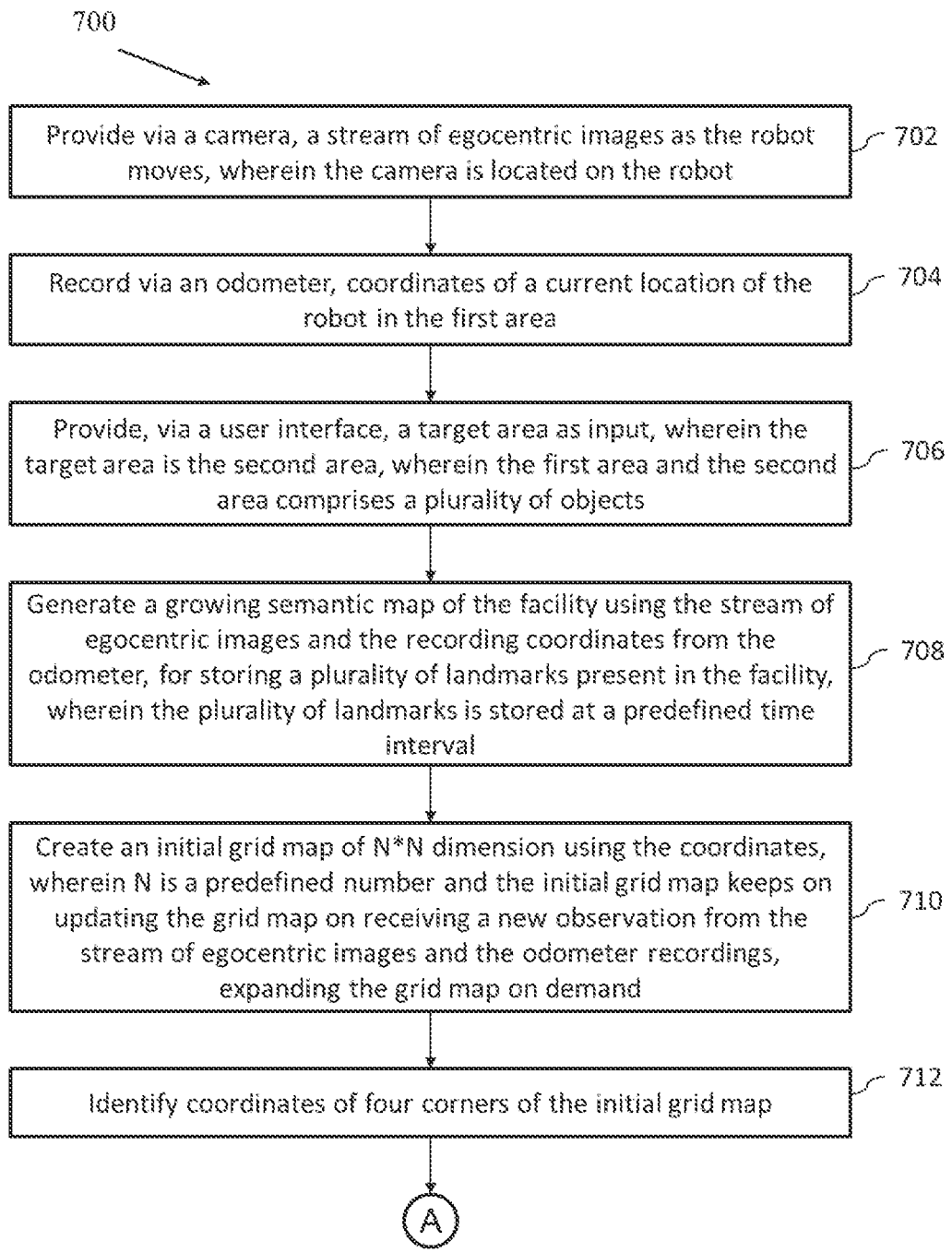
FIGS. 7A-7B is a flowchart of a method for navigation of the robot from the first area to the second area in the facility according to some embodiments of the present disclosure.
Figure 7B:
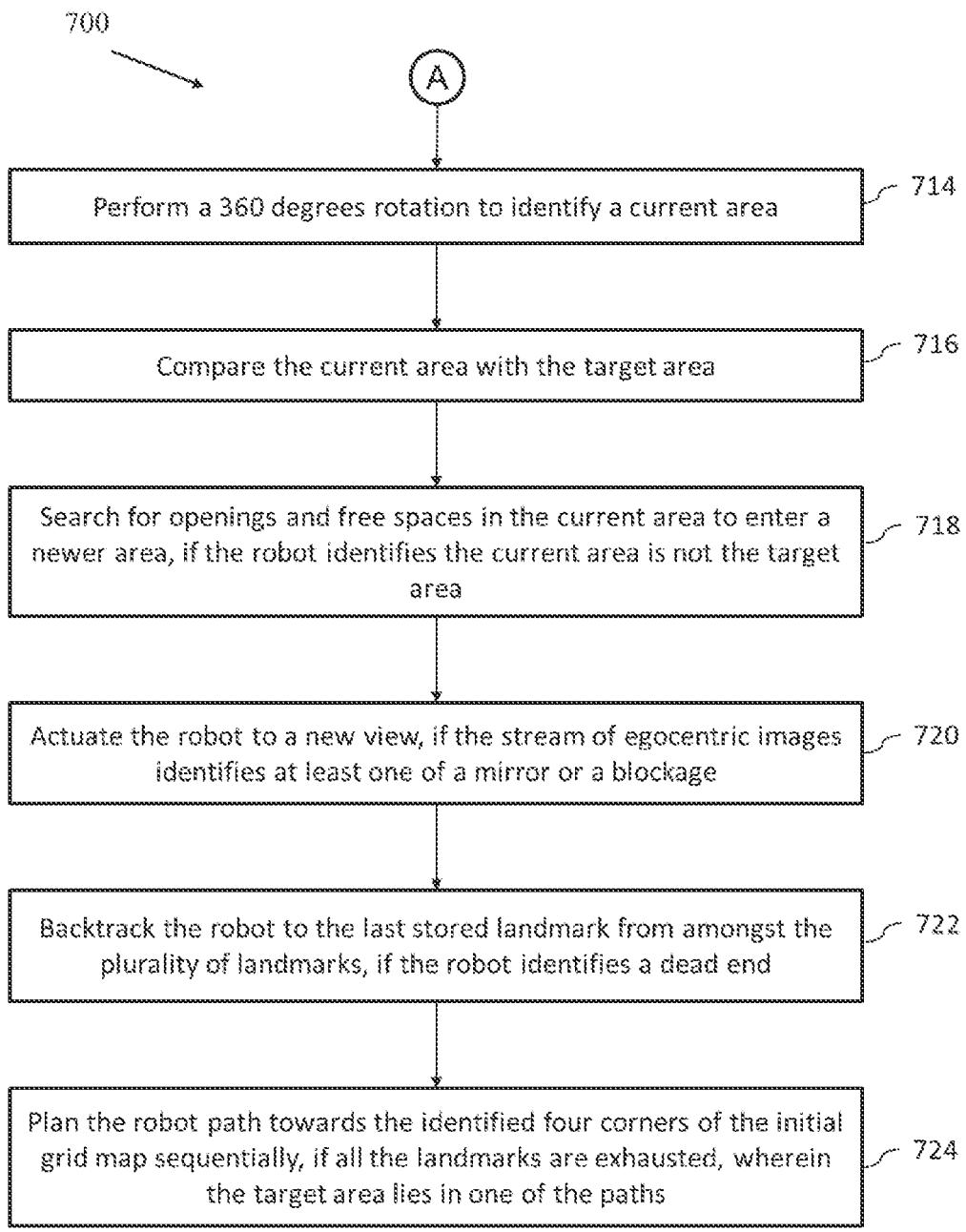

FIGS. 7A-7B illustrates a flow chart of a method 700 for navigation of the robot from the first area to the second area in the facility, in accordance with an example embodiment of the present disclosure. The method 700 depicted in the flow chart may be executed by a system, for example, the system 100 of FIG. 1. In an example embodiment, the system 100 may be embodied in the computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 700 are described with help of system 100. However, the operations of the method 700 can be described and/or practiced by using any other system.

Initially at step 702 of the method 700, a stream of egocentric images is received which are captured via the camera 116 as the robot 114 moves, wherein the camera 116 is located on the robot 114. The robot 114 is provided with the RGB-D camera sensor 116 and wheel encoders that gives at each timestep, the RGB image, Depth image and absolute pose of the robot with respect to the start location. The depth image is converted to an egocentric point cloud using known camera intrinsic and then it is flattened along the vertical axis (z-axis) to obtain an egocentric top down projection occupancy map which contains the obstacles the robot perceives from its current point of view.

At step 704 of the method 700, coordinates of a current location of the robot 114 in the first area is recorded, via the odometer 118. The odometer 118 is also located on the robot 114.

In the next step 706, the target area is provided as the input. The target area is the second area, wherein the first area and the second area comprise a plurality of objects. The example of plurality of objects may comprises a table, a bed, a chair, a cupboard, or any other household things.

At step 708 of the method 700, a growing semantic map of the facility is generated using the stream of egocentric images and the coordinates recorded from the odometer 118, for storing a plurality of landmarks present in the facility, wherein the plurality of landmarks is stored at a predefined time interval.

At step 710 of the method 700, an initial grid map of N*N dimension is created using the coordinates, wherein N is a predefined number and the initial grid map keeps on updating on receiving a new observation from the stream of egocentric images and the odometer recordings. Further at step 712, coordinates of four corners of the initial grid map are identified.

In the next step 714 of the method 700, a 360 degrees rotation performed to identify a current area. The robot 114 predicts the area based on object-region relations, region-region transitions and learnt spatial Graph Convolutional Network (GCN) embeddings. A GCN is trained using random walks over large number of scenes in an embodied AI simulator environment (like AI Habitat) to extract embedding representation for each node (object and areas). Then, based on aforementioned inputs a decision is taken to move towards target. At step 716, the current area is then compared with the target area.

Area Identifier: In the 'AreaGoal' task, the robot does a full 360° rotation at intervals. The rotation is triggered either by (a) rotation interval counter or (b) when it is detected that robot 114 has entered a new area (based on passing detected openings) or (c) objects dissimilar to last region is detected. p(O) denotes probability of an object based on frequency of occurrence among all 'x' objects. Similarly, p(R) denotes the probability of a region among all regions based on the frequency of occurrence in observations. c(O) denotes confidence score of the object detector for that object class. p(R|O) denotes conditional probability that robot 114 is in one of 'y' regions based on a single object view. The robot invokes the edge values of the Region Relation Graph for each of the objects O in the rotation view to predict the most probable region R as shown below:

$$R = \max(\Sigma(p(O_x) * p(R_y) * c(O_i) * p(R_y | O_x))/N))$$

According to an embodiment of the disclosure, the identification of an area is generally determined by the type of objects the area contains. As an example, an area 'bedroom' will contain the object 'bed' and optionally 'chair', 'clock', 'cell phone', etc. In this regard, Mask RCNN and Yolo based approaches trained on MS Coco dataset has been used extensively in literature. However, contrary to the simulation environments like AI habitat, where object category identification uses ground-truth with 100% confidence, the current framework was been made in a way to work in real world, without using any ground-truth. In the present case, robot observations (RGB-D image frames and odometer readings) are taken as input and action is given as output—this is the only communication between the simulation environment (treated as black box) and our modules. Through studies in both black box simulation settings and real world indoor environments, Yolo.v.4 was found to perform better than Mask-RCNN for real-time robot observation processing in indoor scenes, and hence has been adopted.

In order for the robot 114 to navigate out of an area, it is important to detect openings. The object detection algorithm (Yolo) was pre-trained for additional 3 object classes: 'open door', 'closed door' and 'free area' (passage). This classes do not exist in off-the shelf Yolo models. The training was done by manually annotating 100 images per class taken from simulation environment and real world (Google Images) using an image class annotator tool. Another alternative way that was employed was looking for rectangular contours in depth image using an upper threshold cutoff value.

In the next step 718 of the method 700, if the robot 114 identifies the current area is not the target area, then openings and free spaces are searched in the current area to enter a newer area. The 'AreaGoal' problem specifically deals with navigating from area CA' to target area 'Z' via intermediate areas as per layout of the indoor environments. In this regard, the past history of traversal through regions can guide whether a robot is moving towards the target area. As an example, when navigating from 'kitchen' to 'bedroom' the robot will have to generally navigate via intermediate region of 'dining room'.

At step 720, of the method 700, if the stream of egocentric images identifies at least one of a mirror or a blockage, then the robot 114 is actuated to a new view. According to an embodiment of the disclosure, the blockage can be dealt using an obstacle avoidance mechanism. In an example the obstacle avoidance mechanism works based on depth sensor, however, it works in a passive way, i.e. when a 'move forward' instruction is given and there is an obstacle in front, the robot 114 will try to move, but its sensors will prohibit it from executing the task. In another example, the obstacle avoidance mechanism analyses depth images and converting them into 'free' and 'occupied spaces' based on gray-scale threshold value.

A typical indoor house may consist of a large number of mirrors and reflective surfaces. If the robot relies on its depth sensor for finding free spaces, a mirror gives wrong depth information resulting in robot collision. The system 100 may employ one of the following two strategies to detect mirror or a reflective surface. Firstly, a check is kept if current and past RGB image observations across robot steps are very similar using a threshold parameter. Secondly, the approach of Mirror3D is adopted to identify reflective surfaces and correct depth estimates to aid the robot 114 in successful navigation.

In the next step 722, the robot 114 is backtracked to the last stored landmark from amongst the plurality of landmarks, if the robot 114 identifies a dead end. The backtracking is done using the visual semantic map as disclosed above. Certain places as landmarks having more than one branches (openings) and objects having high affinity with target area. In case, the robot 114 meets a dead end or has followed a branch path, instead of exploring, it can directly invoke the 'PointNav' module 120 to go to the nearest unexplored landmark grid cell.

And finally, at step 724 of the method 700, the robot path is planned towards the identified four corners of the initial grid map sequentially, if all the landmarks are exhausted, wherein the target area lies in one of the paths.

Once the robot 114 reaches the target area, the system 100 is also configured to navigate the robot 114 to the center of the area. Once target area is identified using aforementioned methodology (i), next the robot 114 needs to navigate to a center point. This can be achieved by invoking the mapper module 126 to identify the coarse boundary from depth observation and estimating a center point that is navigable. A simple implementation will be a heuristic based estimation to calculate a point and pass it on to the 'PointNav' module 120. The point in 2D plane can be calculated as follows:

$$\frac{(\text{centroid (visible objects' average depth points)} + \text{centroid (coarse region map perimeters)})}{2}$$

In the 'ViewAreaGoal' task, the task is said to be complete when the target area comes in view or objects related to that area comes in view. This is accomplished by seeing related objects to target region in subsequent image frames with high confidence, provided the objects are at a distance from current robot position. Sometimes, it may happen that due to occlusion or failure in object detection algorithm, the robot 114 needs to enter the area in order for related objects to be detected. Then this problem reduces to standard 'AreaGoal' task.

According to an embodiment of the disclosure the system 100 also comprises a mapper module 126. When an object says 'bed' related to target area 'bedroom' comes in view of the robot 114, it needs to move towards 'bed' to maximize its chance of being within the target area. This is done by the mapper module 126, that takes the RGB-D bounding box of identified object and maps it to a point on the 2D navigable surface. This point can be passed to a 'PointGoal' local planner to plan the route avoiding obstacles.

Experimental Results

The baselines in this case are: (a) Random exploration: the robot does random movements, until the area comes into view (b) Frontier-based exploration: The robot tries to explore the entire layout of an indoor house, and while doing so will encounter the target area at some point of time. This in some way is a brute force search method and the success mostly depends how close the target area is to the randomly initialized robot pose. 20 scene groups of Matterport 3D (MP3D) dataset that was available online, were used to devise tasks for different target regions (areas). Ground truth information of the regions were used as boundaries of areas. Visual inspection was also carried out in scene groups giving poor results to identify the underlying cause, and adapt the algorithm heuristics. Through ablation studies, it was found contrary to 'ObjectGoal' task, learnt GCN embeddings do not enhance 'AreaGoal' task—hence it is not used in the baseline experiments. Considering MP3D house layouts being quite large, the upper limit of step count was kept at 500, by which, if the robot is unable to reach the target area, the search terminates as failure. The comparison of the disclosed 'AreaGoal' navigation method with baselines for different target areas (Goal) is shown in TABLE 1.

TABLE 1

Comparison of above AreaGoal method with baselines for different target areas (Goal)

| Target Goal | Method | AreaViewGoal Task: Success↑ | Step↓ | AreaGoal Task: Success↑ | Step↓ |
|---|---|---|---|---|---|
| Bathroom or toilet | Random | 0.9 | 230 | 0.9 | 212 |
| | Frontier based | 0.9 | 128 | 0.9 | 147 |
| | Disclosed method | 0.95 | 110 | 0.95 | 122 |

TABLE 1-continued

Comparison of above AreaGoal method with baselines for different target areas (Goal)

| Target Goal | Method | AreaViewGoal Task: Success↑ | Step↓ | AreaGoal Task: Success↑ | Step↓ |
|---|---|---|---|---|---|
| Bedroom | Random | 0.85 | 354 | 0.8 | 423 |
| | Frontier based | 0.95 | 178 | 0.95 | 182 |
| | Disclosed method | 0.95 | 125 | 0.95 | 136 |
| Dining room | Random | 0.9 | 190 | 0.9 | 244 |
| | Frontier based | 0.95 | 240 | 0.95 | 246 |
| | Disclosed method | 1.0 | 204 | 1.0 | 220 |
| Study room | Random | 0.5 | 442 | 0.3 | 489 |
| | Frontier based | 0.7 | 390 | 0.65 | 430 |
| | Disclosed method | 0.9 | 280 | 0.85 | 343 |
| Kitchen | Random | 0.9 | 290 | 0.9 | 301 |
| | Frontier based | 0.95 | 157 | 0.95 | 173 |
| | Disclosed method | 1.0 | 122 | 1.0 | 147 |
| Living room | Random | 0.6 | 482 | 0.55 | 497 |
| | Frontier based | 0.85 | 137 | 0.85 | 143 |
| | Disclosed method | 0.95 | 110 | 0.95 | 119 |
| Average across areas | Random | 0.775 | 332 | 0.725 | 361 |
| | Frontier based | 0.83 | 205 | 0.875 | 221 |
| | Disclosed method | 0.958 | 159 | 0.942 | 182 |

The proposed method was also successfully tested in real life settings of indoor home. For use in real world with noise, depth sensor distance up to 2.5 meters were considered for map building or object localization.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem related to successful navigation of telepresence robot. The embodiment thus provides a method and a system for navigation of a robot from a first area to a second area in a facility.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for navigation of a robot from a first area to a second area in a facility, the method comprising:
providing, via a camera, a stream of egocentric images as the robot moves, wherein the camera is located on the robot;
recording, by a system including an odometer, coordinates of a current location of the robot in the first area;

providing, via a user interface, a target area as input, wherein the target area is the second area, wherein the first area and the second area comprises a plurality of objects;

generating, via one or more hardware processors, a growing semantic map of the facility using the stream of egocentric images and the recording coordinates, for storing a plurality of landmarks present in the facility, wherein the plurality of landmarks is stored at a predefined time interval;

creating, via the one or more hardware processors, an initial grid map of N*N dimension using the coordinates, wherein N is a predefined number and the initial grid map keeps on updating a grid map on receiving a new observation from the stream of egocentric images and recording of the coordinates by the odometer, expanding the grid map on demand;

identifying, via the one or more hardware processors, coordinates of four corners of the initial grid map;

performing, via the one or more hardware processors, a 360 degrees rotation to identify a current area, wherein the 360 degrees rotation is triggered either by (a) a rotation interval counter, or (b) when the robot entered a new area based on passing detected openings or (c) objects dissimilar to a last region is detected by the robot;

predicting a most probable region upon invoking edge values of a Region Relation Graph for each of the objects in the 360 degrees rotation by computing a probability of an object based on frequency of occurrence among all the objects, a probability of a region among all regions based on the frequency of occurrence in observations, a confidence score of an object detector for a specific object class, and a conditional probability that the robot is in one of the regions based on a single object view, by:

$$R = \max(\Sigma(p(O_x) * p(R_y) * c(O_i) * p(R_y|O_x)/N))$$

wherein O denotes objects, p(O) denotes the probability of the object based on a frequency of occurrence among all 'x' objects, p(R) denotes the probability of a regions, c(O) denotes the confidence score of the object detector for that object class, p(R|O) denotes the conditional probability, N is a predefined number;

comparing, via the one or more hardware processors, the current area with the target area;

searching, via the one or more hardware processors, for openings and free spaces in the current area to enter a newer area, if the robot identifies the current area is not the target area;

actuating, via the one or more hardware processors, the robot to a new view, if the stream of egocentric images identifies at least one of a mirror or a blockage;

backtracking, via the one or more hardware processors, the robot to a last stored landmark from amongst the plurality of landmarks, if the robot identifies a dead end;

planning, via the one or more hardware processors, a robot path towards the identified four corners of the initial grid map sequentially, if all landmarks are exhausted, wherein the target area lies in one of the robot paths;

navigating the robot to radius of 1 meter of the target area by identifying a coarse boundary from a depth observation and estimating a center point that is navigable; and expanding a grid when a next expected move position of the robot is out of the initial grid map, and each grid cell in the initial grid map consist of multiple points of the objects identified in the view, wherein each of the points include a view angle and in a navigation set of steps of moving forward, the side view objects and openings kept out of view are ignored.

2. The processor implemented method of claim 1 further comprising ending the actuation of the robot if the actuation of the robot crosses a predefined number of steps.

3. The processor implemented method of claim 1, wherein the step of searching openings and free spaces comprises pretraining an object detection algorithm for additional three object classes comprising 'open door', 'closed door' and 'free area'.

4. The processor implemented method of claim 1, wherein the current area is identified based on one or more objects detected over the stream of egocentric images using object-region relations, region-region transitions and learnt spatial Graph Convolutional Network (GCN) embeddings.

5. The processor implemented method of claim 1, wherein the camera is an RGB-D (Red-Green-Blue color channels and Depth channel) camera and an output of the RGB-D camera is converted into the stream of egocentric images.

6. The processor implemented method of claim 1, wherein the mirror is identified using one of the following:
if current and past RGB image observations across robot steps are very similar using a threshold parameter, or
utilizing Mirror3D approach to identify correct depth estimates.

7. The processor implemented method of claim 1, wherein the backtracking is done using a visual semantic map.

8. A system for navigation of a robot from a first area to a second area in a facility, the system comprises:
a camera, located on the robot, configured to provide a stream of egocentric images as the robot moves;
an odometer, located on the robot, configured to record distance traveled of a current location of the robot in the first area;
a user interface for providing a target area as input, wherein the target area is the second area, wherein the first area and the second area comprises a plurality of objects;
one or more hardware processors;
a memory in communication with the one or more hardware processors, wherein the one or more hardware processors are configured to execute programmed instructions stored in one or more memories, to:
generate a growing semantic map of the facility using the stream of egocentric images and the recording coordinates by the odometer, for storing a plurality of landmarks present in the facility, wherein the plurality of landmarks is stored at a predefined time interval;
create an initial grid map of N*N dimension using the coordinates, wherein N is a predefined number and the initial grid map keeps on updating a grid map on receiving a new observation from the stream of egocentric images and recording of the coordinates by the odometer, expanding the grid map on demand;
identify coordinates of four corners of the initial grid map;
perform a 360 degrees rotation to identify a current area, wherein the 360 degrees rotation is triggered either by (a) a rotation interval counter, or (b) when the robot entered a new area based on passing detected openings or (c) objects dissimilar to a last region is detected by the robot;

predict a most probable region upon invoking edge values of a Region Relation Graph for each of the objects in the 360 degrees rotation by computing a probability of an object based on frequency of occurrence among all the objects, a probability of a region among all regions based on the frequency of occurrence in observations, a confidence score of an object detector for a specific object class, and a conditional probability that the robot is in one of the regions based on a single object view, by:

$$R=\max(\Sigma(p(O_x)*p(R_y)*c(O_i)*p(R_y|O_x)/N))$$

wherein O denotes objects, p(O) denotes the probability of the object based on a frequency of occurrence among all 'x' objects, p(R) denotes the probability of a regions, c(O) denotes the confidence score of the object detector for that object class, p(R|O) denotes the conditional probability, N is a predefined number;

compare the current area with the target area;

search for openings and free spaces in the current area to enter a newer area, if the robot identifies the current area is not the target area;

actuate the robot to a new view, if the stream of egocentric images identifies at least one of a mirror or a blockage;

backtrack the robot to a last stored landmark from amongst the plurality of landmarks, if the robot identifies a dead end;

plan a robot path towards the identified four corners of the initial grid map sequentially, if all landmarks are exhausted, wherein the target area lies in one of the robot paths; and navigating the robot to radius of 1 meter of the target area by identifying a coarse boundary from a depth observation and estimating a center point that is navigable; and expanding a grid when a next expected move position of the robot is out of the initial grid map, and each grid cell in the initial grid map consist of multiple points of the objects identified in the view, wherein each of the points include a view angle and in a navigation set of steps of moving forward, the side view objects and openings kept out of view are ignored.

9. The system of claim 8, further configured to end the actuation of the robot if the actuation of the robot crosses a predefined number of steps.

10. The system of claim 8, wherein the step of searching openings and free spaces comprises pretraining an object detection algorithm for additional three object classes comprising 'open door', 'closed door' and 'free area'.

11. The system of claim 8, wherein the camera is an RGB-D camera and an output of the RGB-D camera is converted into the stream of egocentric images.

12. The system of claim 8, wherein the backtracking is done using a visual semantic map.

13. One or more non-transitory machine-readable information storage mediums comprising one or more instructions which when executed by one or more hardware processors cause:

providing, via a camera, a stream of egocentric images as a robot moves, wherein the camera is located on the robot;

recording, by a system including an odometer, coordinates of a current location of the robot in a first area;

providing, via a user interface, a target area as input, wherein the target area is a second area, wherein the first area and the second area comprises a plurality of objects;

generating, a growing semantic map of a facility using the stream of egocentric images and the recording coordinates, for storing a plurality of landmarks present in the facility, wherein the plurality of landmarks is stored at a predefined time interval;

creating an initial grid map of N*N dimension using the coordinates, wherein N is a predefined number and the initial grid map keeps on updating a grid map on receiving a new observation from the stream of egocentric images and recording of the coordinates by the odometer, expanding the grid map on demand;

identifying coordinates of four corners of the initial grid map;

performing a 360 degrees rotation to identify a current area, wherein the 360 degrees rotation is triggered either by (a) a rotation interval counter, or (b) when the robot entered a new area based on passing detected openings or (c) objects dissimilar to a last region is detected by the robot;

predicting a most probable region upon invoking edge values of a Region Relation Graph for each of the objects in the 360 degrees rotation by computing a probability of an object based on frequency of occurrence among all the objects, a probability of a region among all regions based on the frequency of occurrence in observations, a confidence score of an object detector for a specific object class, and a conditional probability that the robot is in one of the regions based on a single object view, by:

$$R=\max(\Sigma(p(O_x)*p(R_y)*c(O_i)*p(R_y|O_x)/N))$$

wherein O denotes objects, p(O) denotes the probability of the object based on a frequency of occurrence among all 'x' objects, p(R) denotes the probability of a regions, c(O) denotes the confidence score of the object detector for that object class, p(R|O) denotes the conditional probability, N is a predefined number;

comparing the current area with the target area;

searching for openings and free spaces in the current area to enter a newer area, if the robot identifies the current area is not the target area;

actuating the robot to a new view, if the stream of egocentric images identifies at least one of a mirror or a blockage;

backtracking the robot to a last stored landmark from amongst the plurality of landmarks, if the robot identifies a dead end;

planning a robot path towards the identified four corners of the initial grid map sequentially, if all landmarks are exhausted, wherein the target area lies in one of the robot paths;

navigating the robot to radius of 1 meter of the target area by identifying a coarse boundary from a depth observation and estimating a center point that is navigable; and expanding a grid when a next expected move position of the robot is out of the initial grid map, and each grid cell in the initial grid map consist of multiple points of the objects identified in the view, wherein each of the points include a view angle and in a navigation set of steps of moving forward, the side view objects and openings kept out of view are ignored.

14. The one or more non-transitory machine-readable information storage mediums of claim 13, further cause ending the actuation of the robot if the actuation of the robot crosses a predefined number of steps.

15. The one or more non-transitory machine-readable information storage mediums of claim 13, wherein the step of searching openings and free spaces comprises pretraining an object detection algorithm for additional three object classes comprising 'open door', 'closed door' and 'free area'.

16. The one or more non-transitory machine-readable information storage mediums of claim 13, wherein the current area is identified based on one or more objects detected over the stream of egocentric images using object-region relations, region-region transitions and learnt spatial Graph Convolutional Network (GCN) embeddings.

17. The one or more non-transitory machine-readable information storage mediums of claim 13, wherein the camera is an RGB-D (Red-Green-Blue color channels and Depth channel) camera and an output of the RGB-D camera is converted into the stream of egocentric images.

\* \* \* \* \*